(12) United States Patent
Lam

(10) Patent No.: US 6,862,388 B2
(45) Date of Patent: Mar. 1, 2005

(54) HIGH DENSITY FIBRE COUPLING

(75) Inventor: Yee Loy Lam, Singapore (SG)

(73) Assignee: Nanyang Technological University, Singapore (SG)

(*) Notice: Subject to any disclaimer, the term of this patent is extended or adjusted under 35 U.S.C. 154(b) by 120 days.

(21) Appl. No.: 10/207,395

(22) Filed: Jul. 30, 2002

(65) Prior Publication Data

US 2004/0022496 A1 Feb. 5, 2004

(30) Foreign Application Priority Data

Jul. 30, 2002 (EP) .............................................. 01306486

(51) Int. Cl.⁷ ............................................... G02B 6/30
(52) U.S. Cl. ........................................ 385/49; 385/14
(58) Field of Search ............................... 385/37, 49–52, 385/88–94, 14

(56) References Cited

U.S. PATENT DOCUMENTS

| | | |
|---|---|---|
| 4,948,960 A | 8/1990 | Simms et al. |
| 5,195,150 A | 3/1993 | Stegmueller et al. |
| 5,668,386 A | 9/1997 | Makiuchi et al. |
| 5,907,650 A | 5/1999 | Sherman et al. |
| 2002/0025122 A1 * | 2/2002 | Ouchi et al. .................. 385/88 |

FOREIGN PATENT DOCUMENTS

WO   WO 98 30935   7/1998

OTHER PUBLICATIONS

Handa Yuichi, Patent Abstract of Japan, "Vertical Input–Output Type Optical Node," vol. 014, No. 573 (E–1015), Dec. 19, 1990, Publication No. 02248096, Publication Date Oct. 3, 1990.

Okuda Eiji, "Plate Lens Array with Guide," vol. 014, No. 345 (P–1083), Jul. 26, 1990, Publication No. 02123301, Publication Date May 10, 1990.

* cited by examiner

Primary Examiner—Akm Enayet Ullah
Assistant Examiner—Kevin S. Wood
(74) Attorney, Agent, or Firm—Staas & Halsey LLP

(57) ABSTRACT

In present invention, a photonic integrated circuit includes a number of optical coupling ports that extend from the surface of the device through at least a dedicated fibre guiding layer or a planar structure for coupling the end of an optical fibre mounted within the optical coupling port to an underlying planar optical wave guide or other light emitting device so that, in use, light is coupled between the underlying optical wave guide or light emitting device and the optical fibre. The other and of the optical fibre may be coupled to an optical fibre holder or to another optical coupling port. An important advantage of the present invention is the flexibility it gives to a designer since it eliminates the need to for waveguides to be routed to the edge of the chip. It also solves the problem of aligning a large number of fibres onto a chip since the optical coupling ports allow fibres to be passively aligned.

14 Claims, 1 Drawing Sheet

HIGH DENSITY FIBRE COUPLING

BACKGROUND TO THE INVENTION

A photonic integrated circuit (PIC) consists of many routed planar waveguides with multiple coupling ports, which need to be coupled to optical fibres. Aligning and attaching fibres to the ports on a PIC incur insertion losses due to Fresnel reflection and fibre-waveguide misalignment and these losses are one of the most important problems in applying PICs to optical telecommunications systems.

Edge-coupling, or butt-coupling as it is often referred to, is one of the most common methods of attaching fibres to a PIC. This method is widely used since the fibre can be conveniently mounted on the edges of a packing module. However, aligning the fibre to-the edge of a waveguide, or coupling port, without incurring excessive losses can be time consuming and difficult. The alignment process can be either passive or active. Passive alignment requires structures aligned to the coupling ports to be fabricated on the PIC or a substrate and the fibres mounted on the structures. Active alignment requires that the light emitting devices on the PIC are turned on and the fibre physically moved to enable maximum coupling or light into the fibre to be obtained. The fibre is then sealed in place using an adhesive or through laser welding.

On a PIC made up of only a few fibre attachments, fibre alignment and mounting issues are usually not significant a problem. However, for more complicated multiple optical port PICs, aligning each fibre individually to each coupling port incurs excessively high packaging costs. To overcome this problem, an array of V-grooves aligned to the coupling ports on the edges of a chip can be etched on the chip (or on a suitable substrate such as silicon) and the fibres mounted on them. However, this adds to the size and packaging complexity of the chip.

It is accepted that the number of fibres that need to he coupled to a PIC chip can be the main factor in determining its size. Only the edges or a PIC are available for fibre coupling, hence the number of coupling ports is limited to the length of the perimeter of the chip. Additionally, the need to mute the light to the edge for fibre attachment limits the flexibility of a PIC designer and can lead to unnecessarily long waveguides, which incur propagation losses and affect the device performance. Hence, edge coupling is not an efficient and cost effective method for multiple optical port coupling to a PIC, especially if the number of ports is large.

U.S. Pat. No. 5,195,150 and U.S. Pat. No. 4,948,960 disclose the use of a recess in the optical device substrate for receiving an optical fibre, thereby allowing vertical positioning of the fibre with respect to the planar device structure. However, due to the typical thickness of the device substance it is usually necessary to etch a deep recess in the substrate, thereby compromising the mechanical rigidity and structural integrity or the device. Furthermore, despite the depth of this type of recess, the remaining bulk substrate still presents a substantial propagation distance between the light emitting or guiding layers and the optical fibre. Consequently, and as described in U.S. Pat. No. 5,195,150, it is often necessary to fabricate an integrated lens to ensure good light collection and efficient coupling to the optical fibre. Such structures add further to the complexity of device fabrication.

Other techniques for vertical placement of an optical fibre with respect to a planar optical device have been proposed, but these often suffer from the problem of mismatch between planar waveguide and optical fibre dimensions. An example is the use of a fibre with an angled end facet, which necessitates thinning of the optical fibre to allow placement proximate to the underlying waveguide, resulting in a very brittle fibre tip.

SUMMARY OF THE INVENTION

According to a first aspect of the present invention, an optical device comprises an optical fibre coupled to a planar structure, the planar structure having:

a substrate;

an optical section formed an the substrate;

a fibre guiding layer formed on the optical section; and, an optical coupling port that extends from an upper surface of the device through at least the fibre guiding layer, for coupling an end of the optical fibre mounted within the coupling port to the underlying optical section so that, in use, light guided or emitted by the optical section is coupled between the optical section and the optical fibre.

According to a second aspect of the present invention, a method of manufacturing an optical device in accordance with the first aspect of the present invention, comprises the steps of:

depositing a fibre guiding layer on the surface of a planar waveguide structure;

selectively etching a portion of the fibre guiding layer to form an optical coupling port that extends from a surface of the device to an underlying optical section; and, mounting one end of an optical fibre within the optical coupling port.

In the present invention, a "planar structure" is a structure comprising optical and/or optoelectronic waveguide devices, examples of which include semiconductor heterostructures, and planar lightwave circuits such as those based on silica-on silicon, silicon oxynitride on silicon, sol-gel glass and/or polymer based lightwave circuits Preferably, the fibre guiding layer comprises a material selected from a group consisting of dielectrics, including silicon dioxide, silicon nitride and silicon oxynitride; polymers, including polyimide and benzocylcobutene; and, sol-gel based materials, including organic and inorganic compositions. In a preferred example, the fibre guiding layer also functions as a passivating layer.

Preferably, the optical device comprises a light turning section that changes the direction of propagation of light at a junction between the optical section and the optical coupling port. A preferred example of a light turning structure is a mirror. This steers light that impinges on the mirror surface through an angle that is dependent on the orientation of the mirror. A mirror mounted at 45 degrees to the direction of propagation will steer the light through 90 degrees i.e. vertically.

The optical section may be a planar waveguide. In this case, a light turning structure is required to change the direction of propagation of light so that it can be coupled to or from the optical coupling port. However, where the optical section is a light emitting device such as a light emitting diode or vertically coupled surface emitting laser, a light turning structure is not required since the optical coupling port would already be aligned with the direction of light emission.

Preferably, the optical device comprises an optical fibre holder to which an opposite end of the fibre remote from the optical coupling port is mounted. Preferably, the optical fibre holder is positioned adjacent an edge of the planar waveguide structure. Alternatively, the optical device may comprise another optical coupling port within which an opposite end of the optical fibre is mounted. In this manner, the optical device can be provided with on-chip jumper fibres, thereby adding another degree of flexibility to the design.

Preferably, the optical coupling port is filled with an index matching material. More preferably, the index matching material is an optical glue which fixes the optical fibre in place. Alternatively, the optical fibre may be laser welded to the optical coupling port.

Preferably, the optical device comprises a plurality of optical coupling ports

Preferably, the optical device is a photonic integrated circuit (PIC).

The present invention solves the problem of attaching a large number at fibres onto a PIC by providing a surface coupling arrangement whore optical fibres are coupled through the surface of the device via a dedicated fibre guiding layer to an underlying planar waveguide section or light emitting device. The present invention reduces the dependence of the chip size on the number of fibres that need to be mounted. It is known that fibre attachments impose a chip size penalty on the design of the chip as each attachment occupies a finite space and that adjacent fibres also require a fixed amount of spacing between the fibre attachments. Should it be desirable that the number of fibre attachments on a PIC be doubled, the chip size penalty using a conventional edge-coupling technique will increase by a factor of 4, but only by a factor of 2 if the present invention is used. An important advantage of the present invention is the flexibility it gives to a PIC designer since it eliminates the need for waveguides to be routed to the edge of the chip. The present invention also solves the problem of aligning a large number of fibres onto a chip. Through-holes in the fibre guiding layer of the structure form vertical coupling ports that allow fibres to be passively aligned within the part.

BRIEF DESCRIPTION OF THE DRAWINGS

An example of the present invention will now be described in detail with reference to the accompanying drawings, in which.

DETAILED DESCRIPTION

Figure 1:
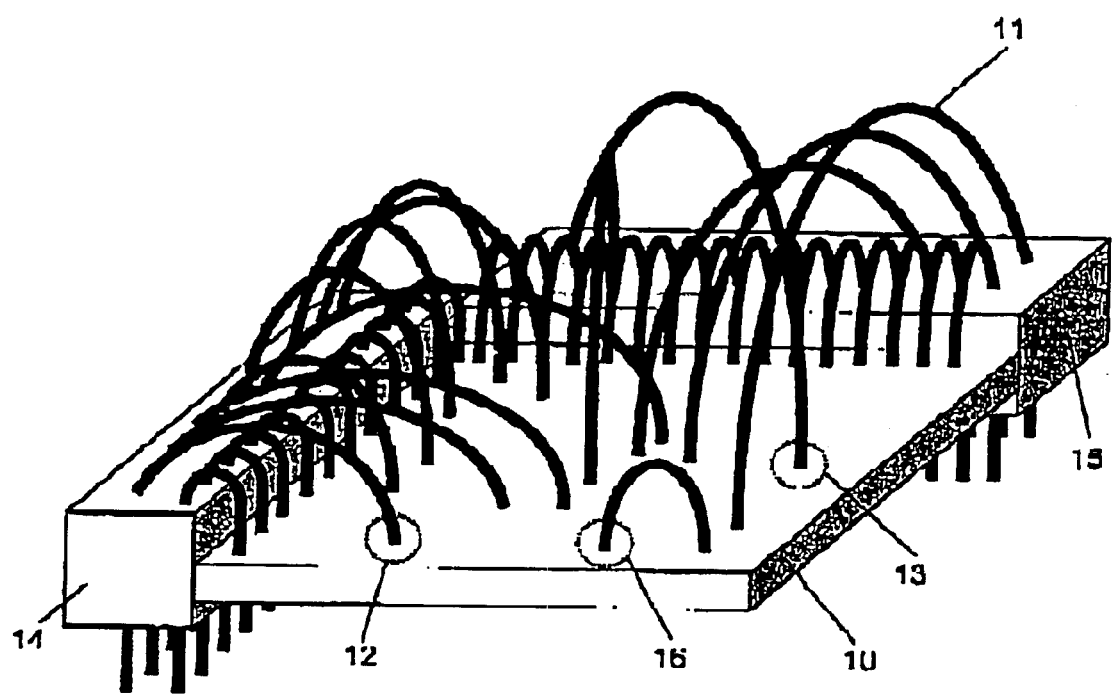
FIG. 1 is an example of a PIC having vertical fibre coupling pores in accordance with the present invention; and, FIG. 2 is an example of a light coupling structure for the PIC assembly of FIG. 1.

An example of a technique for high-density multi-optical port vertical fibre coupling to a photonic integrated circuit (PIC-VFC) is illustrated in FIG. 1. As shown in the Figure, vertical coupling of light to and from a PIC chip 10 is achieved using fibres 11 inserted into the desired coupling points 12, 13 on the chip. The coupling points 12, 13 are realised as vertical-coupling (VC) ports and can be located at any position on the chip 10. The VC ports 12, 13 are coupled by respective fibres 11 to one of a number at optical fibre holders 14, 15 mounted at the edges of the chip 10. This technique has several significant advantages over the conventional edge-coupling approach. The VC port density oil a chip 10 can be much higher. For example, when the area of a chip is doubled, the number of coupling ports will be correspondingly doubled. With the number of coupling ports on a PIC reaching the hundreds or even a thousand in a few years, the present invention may offer the most efficient solution to packaging a PIC chip. Besides eliminating the need to route waveguides to the edges of the chip 10, the present invention also allows on-chip jumper fibres 16 to be realised, which adds another degree of flexibility to a PIC designer.

Figure 2:
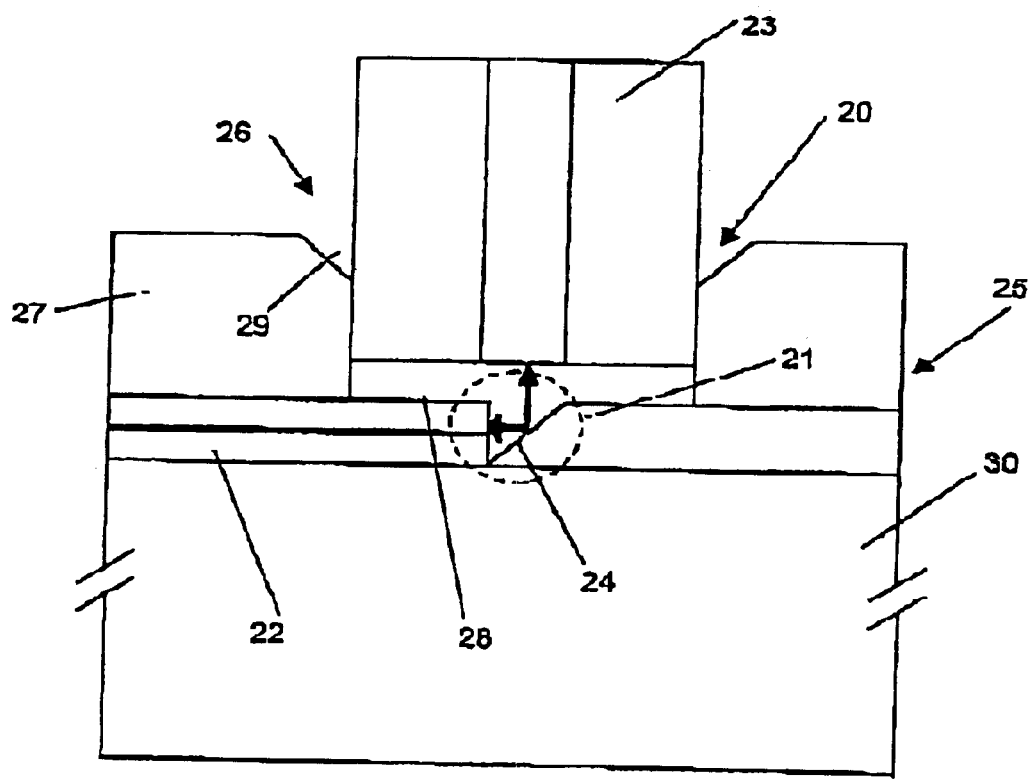

As shown in FIG. 2, a VC port 20 comprises a through hole 26 formed in a dedicated fibre guiding layer (FGL) 27, which can be made of any suitable material. Examples of materials are dielectrics, including silicon dioxide, silicon nitride and silicon oxynitride; polymers, including polyimide and benzocyclobutene; and, sol-gel based material, including organic and inorganic compositions. The VC port 20 can be formed by patterning and etching (either wet or dry process), or by embossing (if the FGL material is deposited in a liquid form).

The FGL 27 eliminates the need for a space-consuming vernal alignment structure and mount, such as a V-groove, ferrule or fibre bracket thus frecing up valuable real estate and further increasing the VC port density of the chip. The funnel top 29 on the through-hole 26 helps to guide the fibre into the VC port 20 and allows wider tolerances for fibre insertion. The alignment method is entirely passive and allows standard industrial equipment such as an auto-insertion system to be used to insert the fibres into the VC ports. The FGL 27 also provides a mechanically stable mount for the fibre 23, which is securely attached to the VC port 20. In addition, the FGL 27 may also function as a passivating layer.

It should be rioted that the FGL 27 is somewhat thinner than the device substrate 30. Optical device substrates can exceed 500 $\mu$m in thickness, although for III-IV optoelectronic devices with A III-V semiconductor substrate thickness will typically be in the range of 300 to 400 $\mu$m. Often the substrate 30 will be lapped down to around 100 to 150 $\mu$m to ease facet cleavage and enhance heat dissipation, but still provide good mechanical support for the optical device formed on it. In contrast, the FGL 27 will have a thickness in the range 20 to 100 $\mu$m, which is sufficient for the robust VC port 20 needed to locate and support the optical fibre 23.

As shown in FIG. 2, the VC port 20 may use a light turning structure (LTS) 21 to change the direction of light propagating in a planar waveguide 22 so that it is redirected onto a fibre 23. This is particularly useful for edge emitting waveguides which are around 1 to 10 $\mu$m thick for silica based waveguides and 1 to 2 $\mu$m for III-V semiconductor based waveguides. For some applications, a VC port does not require an LTS, for example, when coupling to a surface-emitting device or to a surface photo-detecting device. An example of a surface-emitting device is a vertical-cavity surface-omitting laser (VCSEL), which is typically around 4 to 8 $\mu$m thick and emits in a beam diameter of approximately 10 to 40 $\mu$m. An LTS can be implemented in several ways. An LTS using a 45 degree mirror structure 24 is illustrated in FIG. 2, although a grating structure may be used instead.

The fibre 23 is inserted directly onto the chip 25 through the patterned through-hole 26 in the FGL 27. The space 28 between the fibre 23 and chip surface may be filled, if desired, with an index matching material to reduce Fresnel loss. The index matching material may be optical glue, which can also be used to bind the fibre to the VC port 20 and hold it in position. The waveguide edge may be coated with an anti-reflection layer to further reduce Fresnel loss. A high-reflectivity coating may be applied to the mirror to enhance its reflectivity.

An example of a process that can he used to fabricate the VC structure described above is as follows: A layer of photoresist is applied to the wafer, patterned and developed. The wafer is then preferentially wet-etched to obtain a 45 degree mirror. An anti-reflection layer is deposited on the output facet of the active layer and a high-reflection layer is deposited on the mirror. A layer of silicon dioxide, 20 $\mu$m to 100 $\mu$m thick, is then deposited on the wafer using a plasma enhanced chemical vapour deposition (PECVD) system to form the FGI. Besides PECVD silicon dioxide, sol-gel or polyimide can also be used. A patterned and developed photoresist is applied to the silicon dioxide followed by a dry etch process to open the through-holes to the VC port. If sol-gel or polyimide is used, embossing techniques can be used in place of the photoresist and a dry etch cycle used to open the through-holes. An index matching fluid may be applied to the through-hole, though this is optional, and an optical fibre inserted. An adhesive may be used to bind the fibre to the VC port. Alternatively, the fibre may be laser welded to the VC port.

What is claimed is:

1. An optical device comprising an optical fibre coupled to a planar structure, the planar structure having:
    a substrate;
    an optical section formed on the substrate;
    a fibre guiding layer formed on the optical section; and,
    a first optical coupling port and a second optical coupling port extending from an upper surface of the device through at least the fibre guiding layer, wherein each optical coupling port is coupled to a respective end of the optical fibre mounted within the coupling port so that, in use, light guided or emitted by the underlying optical section is coupled between different regions of the optical section through the optical fibre.

2. An optical device according to claim 1, further comprising a light turning section that changes the direction of propagation of light at a junction between the optical section and the optical coupling port.

3. An optical device according to claim 2, in which the light turning section comprises an optical mirror.

4. An optical device according to claim 2, in which the light turning section comprises a grating.

5. An optical device according to claim 1, in which the fibre guiding layer functions as a passivating layer.

6. An optical device according to claim 1, in which the fibre guiding layer comprises a material selected from a group consisting of:
    dielectrics, including silicon dioxide, silicon nitride and silicon oxynitride;
    polymers, including polymide and benzocylcobutene; and,
    sol-gel based materials, including organic and inorganic compositions.

7. An optical device according to claim 1, in which the thickness of the fibre guiding layer is in the range 20 $\mu$m to 100 $\mu$m.

8. An optical device according to claim 1, in which the optical coupling port is filled with an index matching material.

9. An optical device according to claim 8, in which the index matching material is an optical glue which fixes the optical fibre in place.

10. An optical device according to claim 1, in which the optical section is a planar wave guide.

11. An optical device according to claim 1, in which at least a portion of the optical section is a light emitting device.

12. A photonic integrated circuit comprising the optical device of claim 1.

13. A method of manufacturing an optical device according to claim 1, comprising:
    depositing a fibre guiding layer on the surface of a planar structure;
    selectively etching a portion of the fibre guiding layer in two different regions to form a first optical coupling port and a second optical coupling port that extend from a surface of the device to different regions of an underlying optical section; and
    mounting respective ends of an optical fibre within the two optical coupling ports.

14. A method of coupling light between regions of an optical section of an optical device having a planar section, comprising:
    coupling light from one region of the optical section into an optical fibre through one end of the fibre, the fibre end being located in a first optical coupling port which extends from an upper surface of the device through a fibre guiding layer located above the optical section; and
    coupling the light from the optical fibre through the other end of the fibre to another region of the optical section, the other fibre end being located in a second optical coupling port.

* * * * *